Patented Feb. 21, 1950

2,498,003

UNITED STATES PATENT OFFICE 2,498,003

METHOD OF COLORING GLASS

Milton M. Peterson, Corning, N. Y., assignor to Corning Glass Works, Corning, N. Y., a corporation of New York No Drawing. Application August 19, 1946, Serial No. 691,665

5 Claims. (Cl. 49—88)

This invention relates to the treatment of glass to produce a red coloration in its surface with copper which is commonly known as "copper staining" or "red etching." Such process, as hereinbefore practiced, comprises heating the article at a temperature somewhat below the softening point of the glass while in contact with a paste or liquid containing a compound or salt of copper. In case a paste is used, an inert material such as ochre or infusorial earth and a vehicle and adhesive such as water and gum arabic or molasses are included. Upon removal of the residue of the staining medium the glass which was in contact therewith is found to have acquired a greenish or yellowish color. The article is then heated in a reducing atmosphere, whereupon in the case of soda-lime glasses the discolored portion becomes black after which the glass is reheated in an oxidizing atmosphere and the blackened portion becomes red. This process is time consuming and difficult to control and a uniform coloration of satisfactory intensity and clarity is not always obtained.

The primary object of this invention is to provide a method for copper staining glass which is shorter and more reliable than the prior method and which produces a uniform coloration of good quality.

I have found that this may be accomplished by first heating the glass in an atmosphere containing hydrogen and thereafter reheating it in contact with a copper staining composition. The preliminary heating of the glass in a hydrogen containing atmosphere is of great importance and causes the development of a more intense red coloration in the surface of the glass when it is subsequently treated with the copper staining compound and fired than would occur if the preliminary heating in hydrogen were omitted.

I have also found that the addition of a small amount, .25% or more, of an oxide of a polyvalent element to the glass batch before melting it increases the ease of coloration of the glass and intensifies the subsequent color. The oxides of arsenic, antimony, bismuth, tin and lead are preferred. Particularly good results are obtained with 2% to 3% of the oxide of arsenic or antimony. More or less may be employed, if desired.

The temperature of the heat treatments should be as high as possible because the various reactions thereby occur more rapidly, but temperatures too near the softening point of the glass may cause deformation of the article. Softening point is that temperature at which a fibre of the glass of specified size will elongate under its own weight at a given rate when suspended through a small furnace of specified dimensions. (Viscosity of Glass Between the Strain Point and Melting Temperature, by H. R. Lillie, Jr., Am. Cer. Soc., vol. 14, page 502, July 1931.) I prefer to use a temperature about 100° C. below the softening point of the glass. Lower temperatures may be used by increasing the time of heating.

For the preliminary reducing heat treatment of the glass the reducing atmosphere preferably should contain at least 25% and preferably 50% of hydrogen. Larger percentages are more effective but are expensive. Smaller percentages are also effective if the time of heating is increased. I have found that with 50% of hydrogen a soda-lime silicate glass is satisfactorily reduced by heating for about two hours at 100° C. below its softening point.

Numerous copper staining compositions are known which contain one or more salts or compounds of copper, such as the oxide, the chloride, the carbonate, the sulfide, the sulfate, etc. Paste compositions usually contain also a material which is inert or which will not react with the glass at the temperatures employed, such as ochre, and an adhesive such as gum arabic. The staining composition may be applied by spraying or brushing it on the glass in a uniform manner, or by immersion of the glass in the liquid.

In firing the glass in contact with the staining composition, 10 to 20 minutes' heating at a temperature about 100° C. below the softening point of the glass is sufficient although lower temperatures for longer times may also be employed, as pointed out above.

After firing, the residue of the staining composition is removed from the glass by scraping or washing, or both, whereupon the glass will be found to have acquired a uniform deep red coloration in the treated surface. Various designs can be produced by selective staining.

If desired, coloration may be intensified by additionally heating the glass in a reducing atmosphere subsequent to staining it. By such subsequent reduction, the coloration can be increased nearly to opacity.

I claim:

1. The method of obtaining a uniform coloration in the copper-staining of a soda-lime-silicate glass, which comprises first heating the glass in a reducing atmosphere, and thereafter applying a staining composition containing a compound of copper to the glass and heating the glass while in contact with said staining composition to develop color therein.

2. The method of obtaining a uniform coloration in the copper-staining of a soda-lime-silicate glass, which comprises first heating the glass in a reducing atmosphere containing hydrogen, and thereafter applying a staining composition containing a compound of copper to the glass and heating the glass while in contact with said staining composition to develop color therein.

3. The method as claimed in claim 2, in which the reducing atmosphere contains at least 25% of hydrogen.

4. The method of obtaining a uniform coloration in the copper-staining of a soda-lime-silicate glass, which comprises first heating a soda-lime-silicate glass containing up to 3% of an oxide selected from the group consisting of antimony oxide and arsenic oxide in a reducing atmosphere containing hydrogen, and thereafter applying a staining composition containing a compound of copper to the glass and heating the glass while in contact with said staining composition to develop color therein.

5. The method of obtaining a uniform coloration in the copper-staining of selected areas of a shaped article made of a soda-lime-silicate glass, which comprises first heating the article to a temperature on the order of 100° C. below the softening point of the glass in a reducing atmosphere containing at least 25% of hydrogen, and thereafter applying a staining composition containing a compound of copper to selected areas of the article and heating the article while in contact with said staining composition to a temperature on the order of 100° C. below the softening point of the glass to develop color in such selected areas.

MILTON M. PETERSON.

REFERENCES CITED

The following references are of record in the file of this patent:

UNITED STATES PATENTS

| Number | Name | Date |
|---|---|---|
| 2,075,446 | Leibig | Mar. 30, 1937 |
| 2,233,622 | Lytle | Mar. 4, 1941 |
| 2,314,804 | Willson | Mar. 23, 1943 |

FOREIGN PATENTS

| Number | Country | Date |
|---|---|---|
| 4,880 | Great Britain | Nov. 1878 |
| 328,520 | Great Britain | May 1, 1929 |

OTHER REFERENCES

Handbook of Chemistry and Physics, 29th edition, page 314, published by Chemical Rubber Publishing Co. (Copy in Div. 38.)

Partington Textbook of Inorganic Chemistry, 5th edition, 1937, pages 602 and 913. (Copy in Div. 38.)

Hackh's Chemical Dictionary, 3rd edition, 1944, page 75. (Copy in Div. 38.)